United States Patent
Shiino

[11] Patent Number: 5,769,484
[45] Date of Patent: Jun. 23, 1998

[54] OVERFENDER STRUCTURE ON REAR DOOR OF VEHICLE

[75] Inventor: Joutaro Shiino, Hino, Japan

[73] Assignee: Hino Jidosha Kogyo Kabushiki Kaisha, Tokyo, Japan

[21] Appl. No.: 929,407

[22] Filed: Sep. 15, 1997

Related U.S. Application Data

[63] Continuation of Ser. No. 554,521, Nov. 7, 1995, abandoned.

[30] Foreign Application Priority Data

Dec. 27, 1994 [JP] Japan .................................. 6-337007
Jan. 24, 1995 [JP] Japan .................................. 7-027247

[51] Int. Cl.[6] ...................................................... B60J 5/04
[52] U.S. Cl. .............................................. 296/151; 296/209
[58] Field of Search ................................ 296/191, 198, 296/199, 209, 146.9, 151

[56] References Cited

U.S. PATENT DOCUMENTS

| | | | |
|---|---|---|---|
| 2,312,812 | 3/1943 | Geyer | 296/151 |
| 3,035,863 | 5/1962 | Hottle | 296/146.9 |
| 3,726,559 | 4/1973 | Wilfert et al. | 296/209 |
| 4,222,603 | 9/1980 | Breitschwerdt et al. | 296/146.9 |
| 4,488,751 | 12/1984 | Kling | 296/146.9 |
| 5,238,268 | 8/1993 | Logan . | |
| 5,322,338 | 6/1994 | Hirakami | 296/151 |

FOREIGN PATENT DOCUMENTS

| | | | |
|---|---|---|---|
| 3623073 | 1/1988 | Germany | 296/199 |
| 63-104185 | 7/1988 | Japan . | |
| 5-76972 | 10/1993 | Japan . | |

*Primary Examiner*—Dennis H. Pedder
*Attorney, Agent, or Firm*—Oblon, Spivak, McClelland, Maier & Neustadt, P.C.

[57] ABSTRACT

An overfender, which is formed on a rear door of a vehicle adjacent to a rocker molding, extends at its lower end downward along a rear end of the rocker molding to cover the rear end of the rocker molding.

1 Claim, 3 Drawing Sheets

F I G. 5
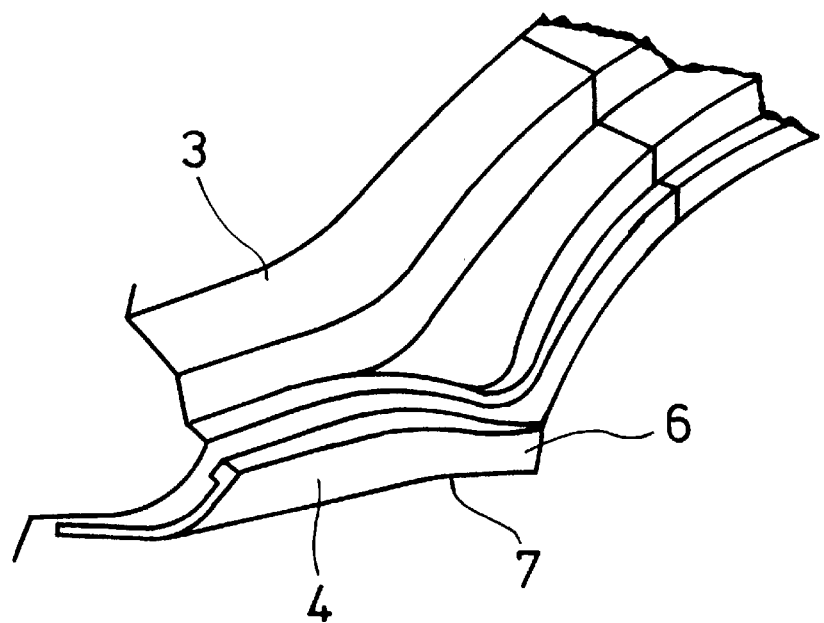
F I G. 6
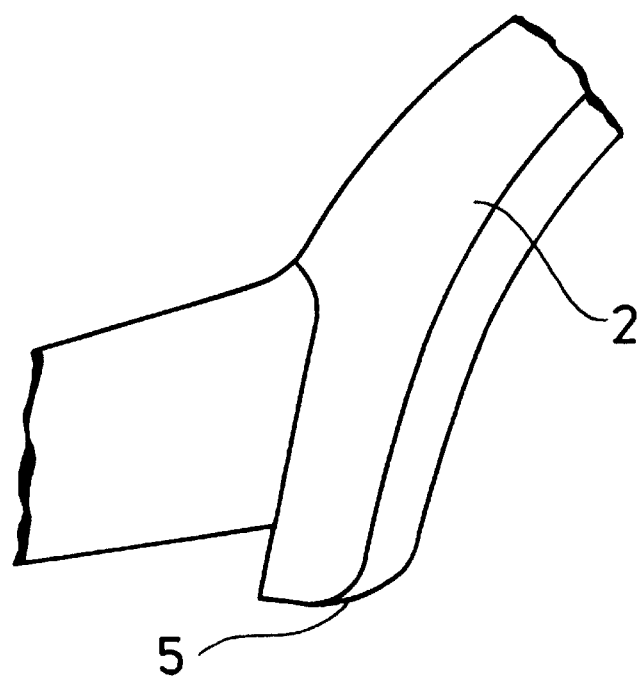

OVERFENDER STRUCTURE ON REAR DOOR OF VEHICLE

This application is a Continuation of application Ser. No. 08/554,521, filed on Nov. 7, 1995, now abandoned.

BACKGROUND OF THE INVENTION

The present invention relates to a vehicle with overfenders and more particularly to an overfender structure on a rear door of the vehicle.

FIG. 1 illustrates a vehicle a which has rear doors b formed with conventional overfenders c. As shown in FIG. 2 which is an enlarged perspective view of a zone A in FIG. 1, the overfender c has a lower end g which overhangs a rear end f of a rocker molding e of a vehicle body d. For appearance's sake, the rear end f is formed with a projection h having a shape in conformity with an external shape of the overfender c. As a result, as shown in FIG. 3 with the rear door b being opened, the projection h is exposed and tends to be trod on by an occupant of the vehicle. This results in necessity of a bracket i as shown in FIG. 3 mounted to the body d below the projection h for reinforcement of the projection h by fastening from upper surface of the rocker molding e.

In the conventional structure as described above, the projection h is exposed when the rear door b is opened, which impairs appearance of the vehicle. Even when the rear door b is closed, a vertical gap j appears between the rocker molding e and the lower end g of the overfender c as shown in FIG. 2, causing impaired appearance. Also, additional work is required for the reinforcement of the projection h. The present invention has its object to overcome these problems encountered in the prior art.

SUMMARY OF THE INVENTION

To solve the above problems, the present invention provides an overfender structure on a rear door of a vehicle comprising an overfender formed on the rear door adjacent to a rocker molding and extending at its lower end downward along a rear end of the rocker molding to cover said rear end of the rocker molding.

In the overfender structure according to the invention, the overfender of the rear door extends at its lower end downward along the rear end of the rocker molding so that, when the rear door is opened, no projection appears unlike the conventional structure. There is no need of performing additional work for reinforcement of any projection and appearance of the vehicle is enhanced.

BRIEF DESCRIPTION OF THE DRAWINGS

FIG. 5 is a perspective view of a vehicle body in the embodiment of the invention; and FIG. 6 is a perspective view of a rear door in the embodiment of the invention.

DETAILED DESCRIPTION OF THE PREFERRED EMBODIMENT

An embodiment of the present invention will be described in conjunction with FIGS. 4 to 6.

Figure 1:
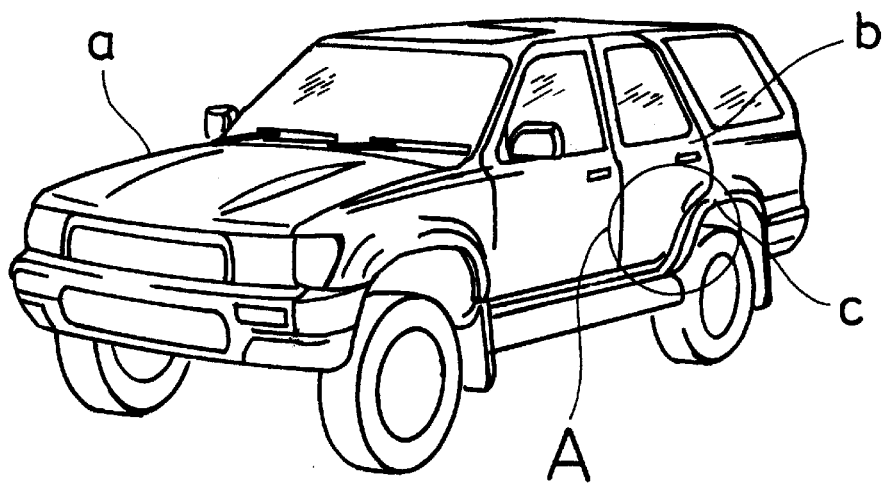
FIG. 1 is a perspective view of a vehicle with conventional overfenders.
Figure 2:
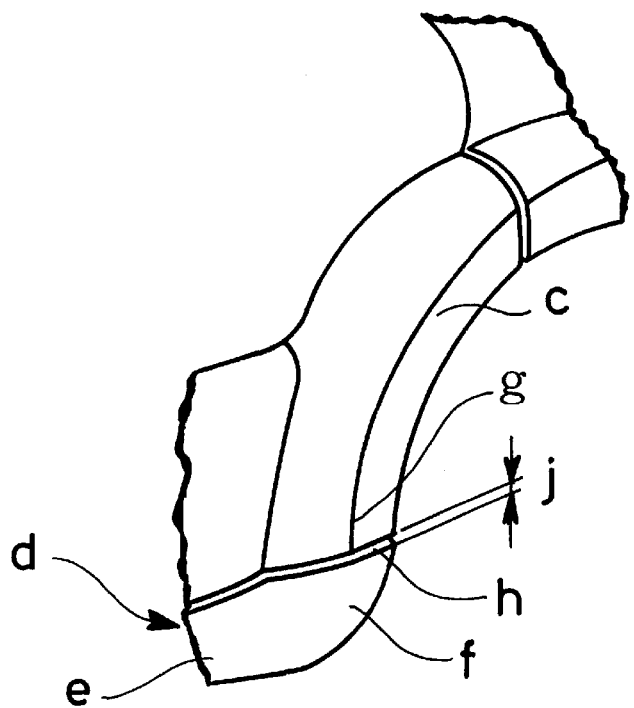
FIG. 2 is an enlarged fragmental perspective view of a zone A in FIG. 1.
Figure 3:
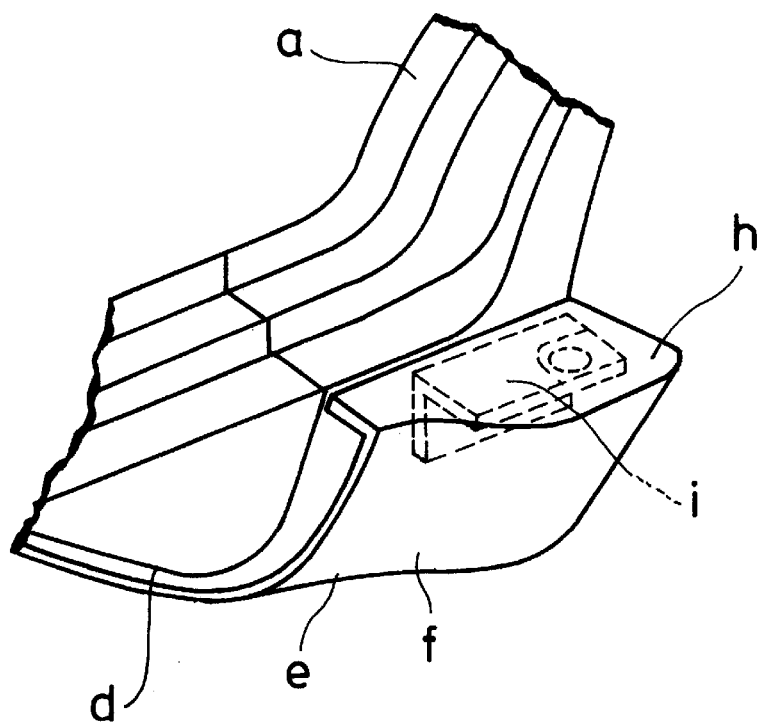
FIG. 3 is a fragmental perspective view showing a rear end of a rocker molding when a rear door is opened in the prior art.
Figure 4:
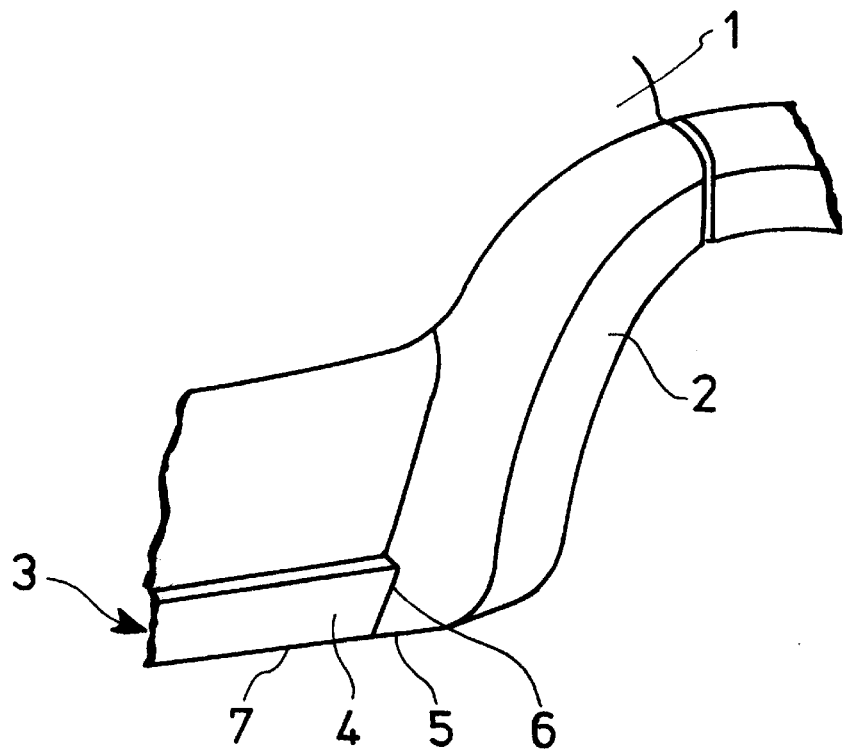
FIG. 4 is a fragmental perspective view of an embodiment of the present invention.

In FIG. 4, reference numeral 1 represents a rear door formed with an overfender 2 for a rear wheel.

Below the rear door 1, a vehicle body 3 has a rocker molding 4 (FIG. 5).

As shown in FIG. 6 which illustrates the rear door 1, the overfender 2 formed on the rear door 1 extends at its lower end 5 along a rear end 6 of the rocker molding 4 (FIG. 5) so as to be substantially coplanar with a lower end surface 7 of the rocker molding 4. As a result, no projection as in the conventional structure is provided on the rear end 6 of the rocker molding 4, which is as shown in FIG. 4.

As shown in FIG. 4 the overfender or fender structure 2 formed on the rear door 1 has an outward extension blended to the shape of a rear fender contour of the vehicle at an upper end of the fender structure 2 of the rear door 1.

As described above, according to the present invention, there is no need of providing, on the rocker molding, a projection which is conventionally formed to receive the lower end of the overfender of the rear door and which must be reinforced to cope with any treading of an occupant of the vehicle treads on the projection. Eliminated is the problem that the projection impairs the appearance when the rear door is opened. No vertical gap appears between the rocker molding and the lower end of the overfender when the rear door is closed, which fact also contributes to improve the appearance of the vehicle.

What is claimed is:

1. A fender structure on a rear door of a vehicle comprising:

a rocker molding attached to a portion of a vehicle body below a lower edge of a substantial portion of the rear door;

a fender extension formed on a rear portion of the rear door;

said fender extension of the rear door blended to the shape of a rear fender contour of the vehicle at an upper end of the fender extension; and said fender extension continuing at its lower end downward along a rear end of the rocker molding to cover said rear end of the rocker molding so as to be substantially coplanar with a lower end surface of said rocker molding.

* * * * *